(12) United States Patent
Attar et al.

(10) Patent No.: US 9,025,073 B2
(45) Date of Patent: May 5, 2015

(54) COMPACT CAMERA OPTICS

(75) Inventors: Ziv Attar, Zichron Yaakov (IL); Yoav Yadin, Pardesiya (IL); Alex Alon, Binyamina (IL)

(73) Assignee: Nan Chang O-Film Optoelectronics Technology Ltd, Nanchang (CN)

( * ) Notice: Subject to any disclaimer, the term of this patent is extended or adjusted under 35 U.S.C. 154(b) by 0 days.

(21) Appl. No.: 13/558,457

(22) Filed: Jul. 26, 2012

(65) Prior Publication Data

US 2013/0021506 A1 Jan. 24, 2013

Related U.S. Application Data

(62) Division of application No. 12/326,918, filed on Dec. 3, 2008, now Pat. No. 8,310,587.

(60) Provisional application No. 61/005,248, filed on Dec. 4, 2007, provisional application No. 60/992,164, filed on Dec. 4, 2007.

(51) Int. Cl.
*G03B 13/00* (2006.01)
*H04N 5/232* (2006.01)
*G03B 13/36* (2006.01)

(52) U.S. Cl.
CPC ............ *H04N 5/23212* (2013.01); *G03B 13/36* (2013.01)

(58) Field of Classification Search
CPC ... G03B 17/02; G03B 2217/002; G03B 13/00
USPC .......................................... 348/349; 396/101
See application file for complete search history.

(56) References Cited

U.S. PATENT DOCUMENTS

| 5,432,404 A | 7/1995 | Ogino et al. |
| 5,777,314 A | 7/1998 | Roustaei |
| 6,567,570 B1 * | 5/2003 | Steinle et al. ................. 382/312 |
| 2005/0024748 A1 * | 2/2005 | Amanai ....................... 359/774 |
| 2005/0057824 A1 | 3/2005 | Amanai |

(Continued)

FOREIGN PATENT DOCUMENTS

WO    WO 2007054931 A2 *  5/2007

OTHER PUBLICATIONS

Office Action dated Aug. 29, 2011 for U.S. Appl. No. 12/326,918, 21 pages.

(Continued)

*Primary Examiner* — Clayton E Laballe
*Assistant Examiner* — Fang-Chi Chang
(74) *Attorney, Agent, or Firm* — Novak Druce Connolly Bove + Quigg LLP

(57) ABSTRACT

Imaging apparatus includes an image sensor, which is adapted to generate an input image in response to optical radiation. A processing engine is configured to apply a digital filter, having a kernel width greater than five pixels, to the input image to generate a filtered image. An optical assembly is arranged to focus the optical radiation onto the image sensor with a point spread function such that no more than a first threshold percentage of energy emitted from a point object and focused by the optical assembly falls within a first region of the image sensor having a first width five times the pitch of the image sensor, while at least a second threshold percentage of the energy emitted from the point object and focused by the optical assembly falls within a second region, which contains the first region and has a second width corresponding to the kernel width.

23 Claims, 4 Drawing Sheets

(56) References Cited

U.S. PATENT DOCUMENTS

| | | |
|---|---|---|
| 2006/0006314 A1 | 1/2006 | Frumker et al. |
| 2006/0193062 A1* | 8/2006 | Ohashi .................. 359/689 |
| 2007/0070525 A1 | 3/2007 | Taniyama |
| 2007/0268376 A1 | 11/2007 | Yoshikawa et al. |
| 2008/0043343 A1* | 2/2008 | Chen et al. ............... 359/689 |
| 2008/0130143 A1 | 6/2008 | Oh et al. |
| 2008/0266413 A1 | 10/2008 | Cohen et al. |
| 2008/0266678 A1* | 10/2008 | Tang ..................... 359/781 |
| 2009/0122150 A1 | 5/2009 | Shabtay et al. |
| 2009/0141140 A1 | 6/2009 | Robinson |
| 2011/0205640 A1* | 8/2011 | Shih ..................... 359/715 |

OTHER PUBLICATIONS

Office Action dated Jan. 11, 2012 for U.S. Appl. No. 12/326,918, 8 pages.

* cited by examiner

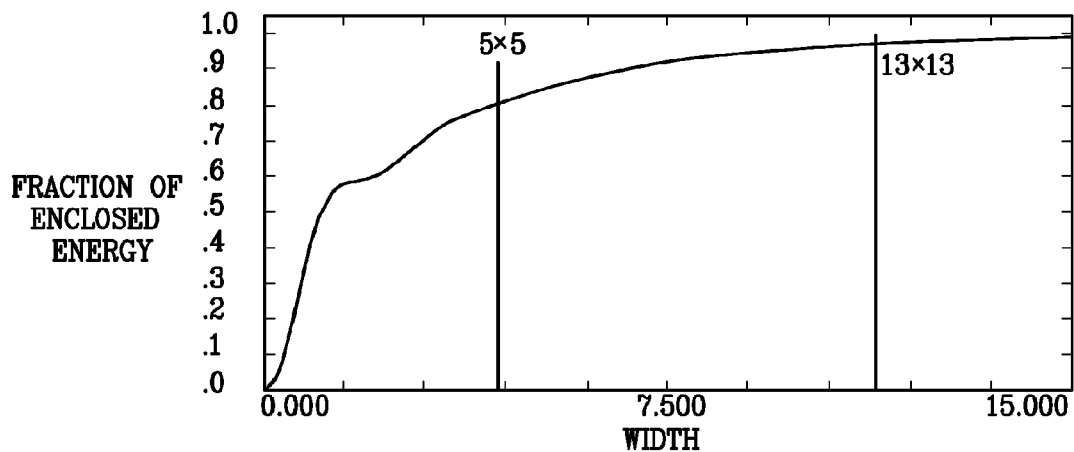
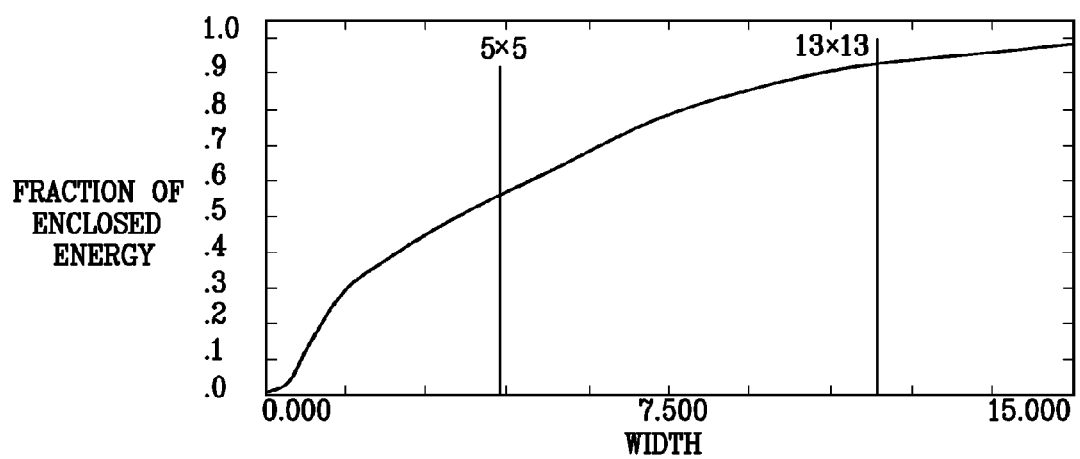

COMPACT CAMERA OPTICS

CROSS-REFERENCE TO RELATED APPLICATIONS

This application is a division of U.S. Non-Provisional patent application Ser. No. 12/326,918, entitled COMPACT CAMERA OPTICS and filed Dec. 3, 2008, which claims the benefit of U.S. Provisional Patent Applications 60/992,164 and 61/005,428 that were filed Dec. 4, 2007, each of which are incorporated herein by reference.

FIELD OF THE INVENTION

The present invention relates generally to digital imaging, and specifically to optics for use in digital imaging cameras.

BACKGROUND OF THE INVENTION

The objective optics used in digital cameras are typically designed so as to minimize the optical point spread function (PSF) and maximize the modulation transfer function (MTF), subject to the limitations of size, cost, aperture size, and other factors imposed by the camera manufacturer. The PSF of the resulting optical system may still vary from the ideal due to focal variations and aberrations. A number of methods are known in the art for measuring and compensating for such PSF deviations by digital image processing. For example, U.S. Pat. No. 6,154,574, whose disclosure is incorporated herein by reference, describes a method for digitally focusing an out-of-focus image in an image processing system.

It is also possible to add a special-purpose blur to an image so as to create invariance to certain optical aberrations. Signal processing is then used to remove the blur. In one technique of this sort, known as "Wavefront Coding," a special aspheric optical element issued to create the blur in the image. This optical element may be a separate stand-alone element, or it may be integrated into one or more of the lenses in the optical system. Optical designs and methods of image processing based on Wavefront Coding of this sort are described, for example, in U.S. Pat. No. 5,748,371 and in U.S. Patent Application Publications US 2002/0118457, US 2003/0057353 and US 2003/0169944, whose disclosures are incorporated herein by reference.

As another example, U.S. Pat. No. 6,927,922, whose disclosure is incorporated herein by reference, describes a system for imaging with a circularly-symmetric multifocal aspheric lens. The multifocal aspheric lens provides a blurred image, which is processed using inverse filtering, matrix convolution, or maximum entropy to obtain an extended depth of field.

U.S. Patent Application Publication US 2006/0256226, whose disclosure is incorporated herein by reference, describes an electronic imaging camera comprising an image sensing array and objective optics. The optics image an object onto the array with a point spread function (PSF) of extent substantially greater than the pitch of the sensing array even at optimal focus of the optics. As a result, the images captured by the array itself are blurred. An image processor, which may be integrated in the camera, applies a deblurring function—typically in the form of a deconvolution filter—to the signal output by the array in order to generate an output image with reduced blur. This sort of processing may similarly be applied to mosaic images, i.e., to images produced by cameras that use a single solid-state image sensor with a multi-colored mosaic filter overlay, as described, for example, in PCT International Publication WO 2007/054931, whose disclosure is incorporated herein by reference.

The above-mentioned US 2006/0256226 describes an iterative method of optical design, which takes into account the digital deblurring capabilities of the camera. This sort of method is described further in U.S. Patent Application Publication US 2007/0236573, whose disclosure is also incorporated herein by reference.

PCT International Publication WO 2007/054938, whose disclosure is incorporated herein by reference, describes an optical imaging assembly that may be used in a digital camera to generate a distorted image, which is then corrected by a deconvolution engine. The optical imaging assembly is configured to produce a high defocus aberration coefficient, which causes the modulation transfer function (MTF) of the assembly to have generally equal low values for all objects in a large field, typically from infinity to approximately 10 cm from the assembly. The deconvolution engine may be configured to improve the MTF at the different object distances and thus to produce images that are substantially free of aberrations for all objects within the field.

SUMMARY OF THE INVENTION

Embodiments of the present invention that are described hereinbelow provide optical designs that can be used in conjunction with deconvolution filtering to provide high-quality output images.

There is therefore provided, in accordance with an embodiment of the present invention, imaging apparatus, including an image sensor, characterized by a pitch, which is adapted to generate an input image in response to optical radiation that is incident on the image sensor. A processing engine is configured to apply a digital filter to the input image so as to generate a filtered image. The digital filter has a kernel, which has a kernel width that is greater than five pixels. An optical assembly is arranged to focus the optical radiation onto the image sensor with a point spread function (PSF) such that no more than a first threshold percentage of energy emitted from a point object and focused by the optical assembly falls within a first region of the image sensor having a first width that is five times the pitch of the image sensor. At least a second threshold percentage of the energy emitted from the point object and focused by the optical assembly falls within a second region, which contains the first region and has a second width corresponding to the kernel width.

In a disclosed embodiment, the second width is thirteen times the pitch, and the second threshold percentage is greater than the first threshold percentage by at least 10%. In one example, the first threshold percentage is 80%, and the second threshold percentage is 90%. Typically, the kernel of the digital filter is selected responsively to the PSF so that the output image has a reduced blur relative to the input image. Optionally, the digital filter has a first kernel for reducing the blur in the output image for a first field extending from a reference distance to infinity and a second kernel, different from the first kernel, for reducing the blur in the output image for a second field extending from a specified near distance to the reference distance.

In some embodiments, the apparatus has a predefined depth of field, and the optical assembly has a through-focus modulation transfer function (MTF) that varies by no more than 50% over the predefined depth of field. In one embodiment, the predefined depth of field extends from 50 cm to infinity, and the optical assembly has an F-number no greater than 2.4. In another embodiment, the predefined depth of field extends from 30 cm to infinity.

There is also provided, in accordance with an embodiment of the present invention, an optical assembly including four even aspheric lenses arranged along an optical axis so as to focus light onto a focal plane, such that a total track length from a front surface of the assembly to the focal plane is no greater than 5 mm, the lenses having alternating positive and negative respective refractive powers.

In a disclosed embodiment, one of the lenses that is closest to the focal plane has first and second surfaces, which both include both convex and concave areas, wherein the first surface has a central convexity surrounded by a concave area, while the second surface has a central concavity surrounded by a convex area.

There is additionally provided, in accordance with an embodiment of the present invention, a method for imaging, that includes generating an input image using an image sensor, characterized by a pitch, in response to optical radiation that is incident on the image sensor. A digital filter is applied to the input image so as to generate a filtered image, the digital filter having a kernel, which has a kernel width that is greater than five pixels. The optical radiation is focused onto the image sensor using an optical assembly with a point spread function (PSF) such that no more than a first threshold percentage of energy emitted from a point object and focused by the optical assembly falls within a first region of the image sensor having a first width that is five times the pitch of the image sensor, while at least a second threshold percentage of the energy emitted from the point object and focused by the optical assembly falls within a second region, which contains the first region and has a second width corresponding to the kernel width.

The present invention will be more fully understood from the following detailed description of the embodiments thereof, taken together with the drawings in which:

BRIEF DESCRIPTION OF THE DRAWINGS

FIGS. 3A and 3B are schematic plots showing energy spread of the PSF of the optical imaging assembly of FIG. 2 at different object distances, in accordance with an embodiment of the present invention;

DETAILED DESCRIPTION OF THE DRAWINGS

Definitions

The following is a non-exhaustive list of technical terms that are used in the present patent application and in the claims. Although these terms are used herein in accordance with the plain meaning accorded the terms in the art, they are listed below for the convenience of the reader in understanding the following description and the claims.

Pitch of a detector array, such as an image sensor, refers to the center-to-center distance between elements of the array. Each element corresponds to a pixel in the image output by the array.

Cylindrical symmetry describes a structure, such as a simple or compound lens, which has an optical axis such that the structure is invariant under rotation about the optical axis for any and all angles of rotation.

Point spread function (PSF) is the impulse response of an optical system in the spatial domain, i.e., the image formed by the system of a bright point object against a dark background.

Extent of the PSF is the width of the region containing a certain substantial portion of the optical energy, such as 90% of the optical energy, in the image formed of a bright point object.

Optical transfer function (OTF) is the two-dimensional Fourier transform of the PSF to the frequency domain.

Modulation transfer function (MTF) is the modulus of the OTF.

Optical radiation refers to electromagnetic radiation in any of the visible, infrared and ultraviolet regions of the spectrum.

System Overview

Figure 1:
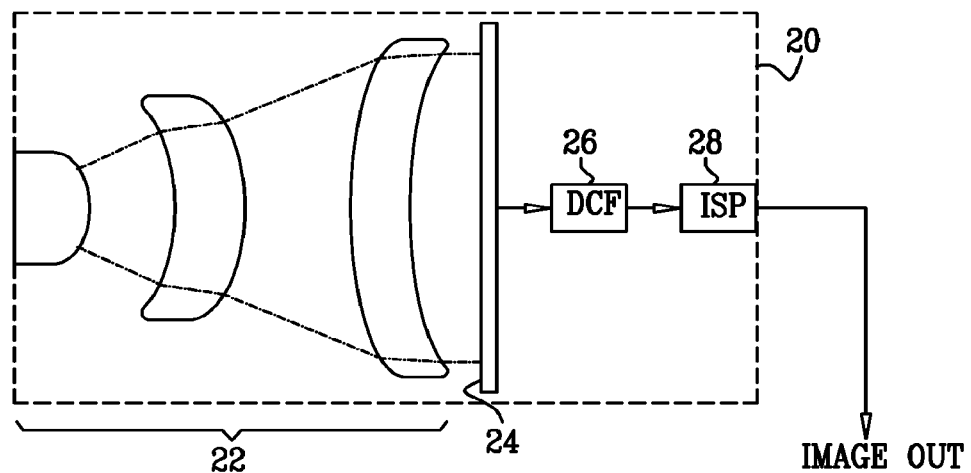
FIG. 1 is a block diagram that schematically illustrates a digital camera, in accordance with an embodiment of the present invention.

FIG. 1 is a block diagram that schematically illustrates a digital camera 20, in accordance with an embodiment of the present invention. The camera comprises an optical imaging assembly 22, comprising a set of cylindrically-symmetrical lenses, which focus an image onto an image sensor 24 at the focal plane of the optics. (The lenses making up assembly 22 are shown schematically in FIG. 1 purely for the sake of illustration, and actual examples of implementation are shown in the figures that follow.)

A processing engine 26 operates on image data that are output by image sensor 24. The processing engine applies one or more digital filters, typically comprising at least one deconvolution filter (DCF), to the image data, as described in the US and PCT patent publications cited in the Background section above. The processing engine may comprise a dedicated hardware device, such as the device described in above-mentioned PCT publication WO 07/054931, or it may, additionally or alternatively, comprise a computer or other programmable device. The DCF kernel is typically chosen so as to correct for blur in the image formed by assembly 22. After filtering, the image data are processed by an image signal processor (ISP) 28, which performs standard functions such as color balance and format conversion and outputs the resulting image.

Optical Features—Design #1

Figure 2:
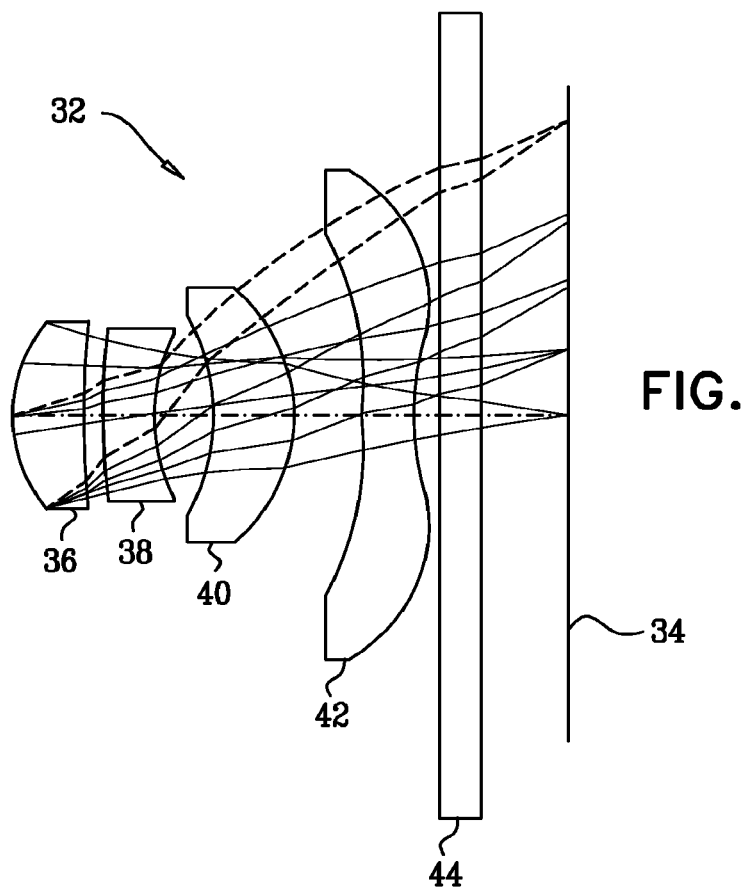
FIG. 2 is a schematic side view of an optical imaging assembly, in accordance with an embodiment of the present invention.

FIG. 2 is a schematic side view of an optical imaging assembly 32, in accordance with an embodiment of the present invention. This assembly may be used in camera 20 in place of assembly 22. The optical design of the assembly by itself produces a blurred image, which is restored by processing engine 26 to produce a sharp image with an extended depth of field. Optical assembly 32 is designed for use with a 3 Megapixel image sensor with a pitch of 1.75 pm. The optical assembly has a low F-number (2.4), giving high sensitivity in low light conditions. When used in conjunction with the deconvolution filter (DCF) that is described below, the design achieves good image quality for object distances from a reference distance of 50 cm to infinity. This depth of field may be extended further to shorter distances, between a specified near distance and the reference distance (over the range 30-50 cm, for example), by using a different DCF kernel that is computed for the shorter distance range.

Assembly 32 comprises five components: four lenses 36, 38, 40 and 42, and an infra-red filter 44. Assembly 32 forms its image on a focal plane 34, which is typically located at the front surface of sensor 24. The total optical track length from the outer surface of lens 36 to the focal plane is 3.8 mm, while the effective focal length of the assembly is 3.4 mm.

Each of the lenses in assembly 32 has two cylindrically-symmetrical, even aspheric surfaces. Such surfaces are defined by the following expression:

$$z = \frac{cr^2}{1 + \sqrt{1 - (1+k)c^2r^2}} + \sum_{n=2}^{n=8} a_n r^{2n} \quad (1)$$

wherein r is the radial coordinate relative to the optical axis, z is the surface sag (the surface coordinate along the optical axis, as a function of r), c and k are curvature and conic constants for the surface, and a2, . . . a8 are the aspheric coefficients of the surface. The values of the optical parameters for the design of assembly 32 are given in Listing 1 in the Appendix below.

Lenses 36, 38, 40 and 42 have optical powers that alternate +, −, +, − respectively. Lenses 36 and 38 have a convex first surface and concave second surface; lens 40 has a concave first surface and convex second surface; and the surfaces of lens 42 include both convex and concave areas. Specifically, the first surface of lens 42 has a central convexity surrounded by a concave area, while the second surface has a central concavity surrounded by a convex area.

To facilitate good image restoration by engine 26 over the entire depth of field, the inventors have found two properties to be desirable:

The through-focus MTF as a function of object distance should be relatively flat, i.e., the ratio between the peak MTF value and the minimal value over the specified depth of field is typically no more than 1.5. This property makes it possible for the processing engine to produce an output image with good, consistent image quality over the entire depth.

The extent of the PSF (measured in pixels of the image sensor at the focal plane of the optical assembly) should correspond roughly to the width of the deconvolution filter kernel, so that the entire kernel is effective in restoring the image.

In other words, the PSF should be sufficiently broad so that no more than a first threshold percentage of the optical energy emitted from a point object is focused to within a narrow inner focal region at the focal plane, since otherwise the outer elements of the kernel will have negligible effect. On the other hand, at least a second threshold percentage of the focused energy (greater than the first threshold) should fall inside a certain wider peripheral focal region. This peripheral focal region contains the inner region and has a width corresponding to the kernel width (i.e., containing the same number of sensor elements as there are pixels in the kernel), since any energy falling outside the bounds of the kernel will be useless for purposes of image restoration. In the case of assembly 32, as specified herein, no more than 80% of the focused energy falls within the inner region whose width is five times the pitch of the image sensor (such as a square of 5×5 pixels) at the focal plane, while at least 90% of the energy is captured within a region whose width is thirteen times the pitch (such as a square of 13×13 pixels).

The above features of the design are illustrated in the plots that follow.

FIGS. 3A and 3B are schematic plots showing the energy spread of the PSF of optical imaging assembly 32 at different object distances along the optical axis, in accordance with an embodiment of the present invention. The plots show the cumulative fraction of energy enclosed within a certain half-width from the axis (measured in um). The vertical lines in the figures show the boundaries of the 5×5 and 13×13 inner and peripheral focal regions mentioned above. FIG. 3A shows the energy spread for an object point at infinity, while FIG. 3B shows the energy spread for an object point 50 cm from the camera. For this design, the captured energy on-axis for a 5×5 pixel square is 79% and 56% for object distances of infinity and 50 cm, respectively, while the captured energy for a 13×13 pixel square is 97% and 92%.

Figure 4:
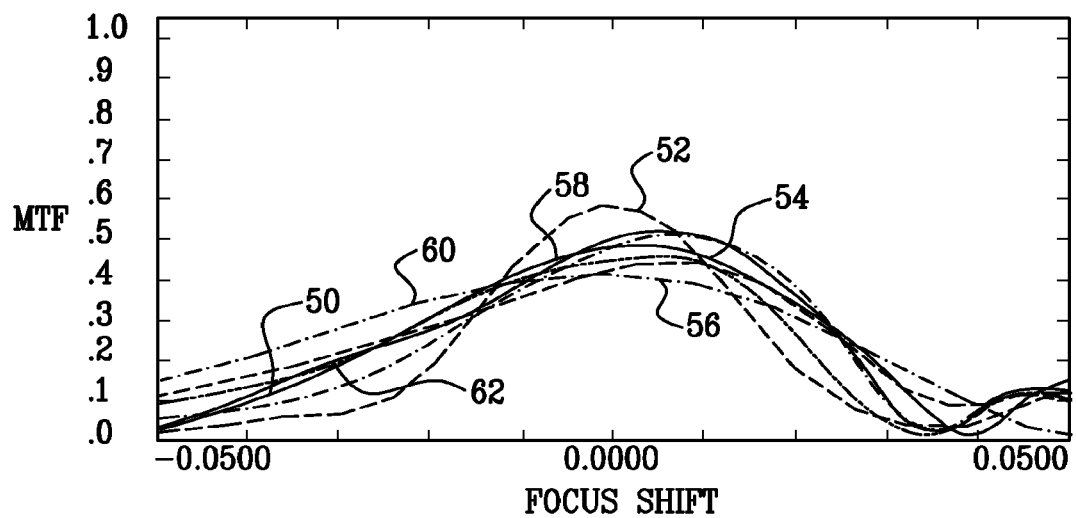
FIG. 4 is a schematic plot showing MTF as a function of focal shift for the optical imaging assembly of FIG. 2, in accordance with an embodiment of the present invention.

FIG. 4 is a schematic plot showing the MTF of optical imaging assembly 32 as a function of focal shift (in mm), in accordance with an embodiment of the present invention. Specifically, the curves in FIG. 4 show the value of the MTF at 140 cycles/mm (which is half the Nyquist frequency of the image sensor detector array in this design) as a function of the image location along the optical axis. This image-based variation is equivalent to the variation of MTF as a function of the object location over a certain depth of field. The origin in FIG. 4 corresponds to the image location for an object distance of 115 cm. A shift of +0.01 mm in the image location corresponds to an object at infinity, while a shift of −0.013 mm in the image location corresponds to an object distance of 50 cm. A curve 50 gives the MTF for on-axis points, while curves 52, 54, 56, 58, 60 and 62 respectively show the sagittal and tangential MTF for points at 50%, 70% and 100% of the corner semi-diagonal of the field of view of the sensor.

The overall MTF of camera 20 is enhanced relative to the MTF of optical assembly 32 alone by application of a deconvolution filter (DCF) in engine 26. The DCF kernel is optimized for the specific PSF of this optical assembly as explained above. In the present case, the sensor elements of image sensor 24 are overlaid by a Bayer color mosaic filter, and the DCF is computed accordingly. Details of the digital processing circuits that are used in applying such a DCF are shown and described in the above-mentioned PCT publication WO 07/054931.

The following table gives the coefficients of the 13×13 DCF kernel used for the optical design that is described above. All coefficients given in the table are multiplied by a factor of 100 if the actual values are 1/100 of the values in the table). The kernel contains coefficients for the red, green and blue channels, according to the positions of the red, green and blue pixels in Bayer pattern on the sensor, as explained in the above-mentioned PCT publication.

TABLE I

DCF KERNEL

| | | | | | | | | | | | | |
|---|---|---|---|---|---|---|---|---|---|---|---|---|
| −0.20 | −0.18 | −0.05 | −0.16 | −0.58 | −0.56 | 0.20 | 0.65 | −0.58 | −0.56 | −0.05 | −0.16 | −0.20 |
| 0.08 | 0.09 | −0.58 | −0.02 | 1.28 | 0.14 | 1.00 | 0.14 | 1.28 | −0.02 | −0.58 | 0.09 | 0.08 |
| −0.05 | −0.16 | −0.52 | −0.32 | 0.62 | 0.14 | −1.31 | −2.95 | 0.62 | 0.14 | −0.52 | −0.32 | −0.05 |
| −0.69 | −0.02 | 0.28 | 0.30 | −3.98 | −0.48 | −12.7 | −0.48 | −3.98 | 0.30 | 1.28 | −0.02 | −0.69 |
| −0.58 | −0.56 | 0.62 | 0.14 | −4.63 | −4.59 | −3.78 | −0.21 | −4.63 | −4.59 | 0.62 | 0.14 | −0.58 |
| −0.26 | 0.14 | 1.00 | −0.48 | −12.7 | 3.11 | 161.5 | 3.11 | −12.7 | −0.48 | 1.00 | 0.14 | −0.26 |
| 0.20 | 0.65 | −1.31 | 2.95 | −3.78 | −0.21 | 129.9 | 135.0 | −3.78 | −0.21 | −1.31 | −2.95 | 0.20 |
| −0.69 | 0.14 | 1.28 | −0.48 | −3.98 | 3.11 | −12.7 | 3.11 | −3.98 | −0.48 | 1.28 | 0.14 | −0.69 |
| −0.58 | −0.56 | 0.62 | 0.14 | −4.63 | −4.59 | −3.78 | −0.21 | −4.63 | −4.59 | 0.62 | 0.14 | −0.58 |
| 0.08 | −0.02 | −0.58 | 0.30 | 1.28 | −0.48 | 1.00 | −0.48 | 1.28 | 0.30 | −0.58 | −0.02 | 0.08 |
| −0.05 | −0.16 | −0.52 | −0.32 | 0.62 | 0.14 | −1.31 | −2.95 | 0.62 | 0.14 | −0.52 | −0.32 | −0.05 |
| −0.15 | 0.09 | 0.08 | −0.02 | −0.69 | 0.14 | −0.26 | 0.14 | −0.69 | −0.02 | 0.08 | 0.09 | −0.15 |
| −0.20 | −0.18 | −0.05 | −0.16 | −0.58 | −0.56 | 0.20 | 0.65 | −0.58 | −0.56 | −0.05 | −0.16 | −0.20 |

Figure 5:
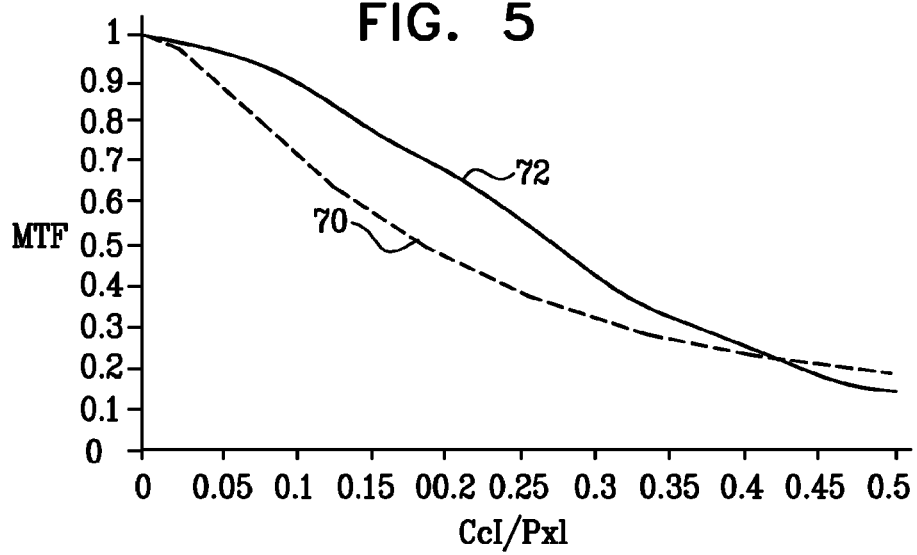
FIG. 5 is a schematic plot of MTF as a function of frequency for the optical imaging assembly of FIG. 2, before and after application of deconvolution filtering, in accordance with an embodiment of the present invention.

FIG. 5 is a schematic plot of MTF as a function of spatial frequency for optical assembly 32, before and after application of deconvolution filtering using the kernel in Table I, in accordance with an embodiment of the present invention. The spatial frequency is given in units of cycles/pixel, referred to the pitch of the image sensor. The plot includes an uncorrected curve 70, corresponding to the MTF of optical assembly 32 by itself. A corrected curve 72 shows the net MTF of camera 20 that is achieved by applying the DCF to the image sensor output.

The curves in FIG. 5 show the MTF at the center of the optical field in the green sub-image produced by the mosaic sensor, with the object at an infinite distance from the camera. Similar curves can be observed for the red and blue sub-images, as well as for other object distances and field points. These curves show that the combined operation of the optical assembly and the DCF give substantial enhancement of the image resolution over the entire field, from 50 cm to infinity.

Optical Features—Design #2

Figure 6:
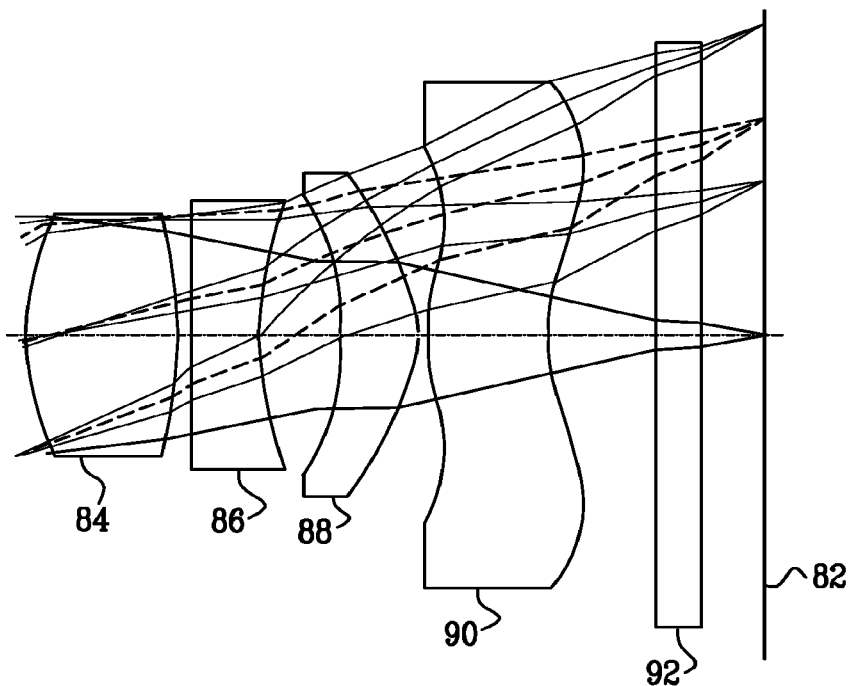
FIG. 6 is a schematic side view of an optical imaging assembly, in accordance with another embodiment of the present invention.

FIG. 6 is a schematic side view of an optical imaging assembly 80, in accordance with an alternative embodiment of the present invention. This assembly, like assembly 32, may be used in camera 20 in place of assembly 22, and shares many of the desirable properties of assembly 32. Assembly 80 is likewise designed for use with a 3 Megapixel image sensor with a pitch of 1.75 pm. It has less depth of field than assembly 32 (from 70 cm to infinity), but has a lower F-number (2.2), for greater sensitivity in low light conditions.

Assembly 80 comprises five components: four lenses 84, 86, 88 and 90, and an infra-red filter 92. Assembly 32 forms its image on a focal plane 82, which is typically located at the front surface of sensor 24. An aperture stop (not shown) precedes the front surface of lens 84. The total optical track length from the outer surface of lens 84 to the focal plane is 4.86 mm, while the effective focal length of the assembly is 3.73 mm. Each of the lenses in assembly 80 has two cylindrically-symmetrical, even aspheric surfaces, as defined above. The values of the optical parameters for the design of assembly 80 are given in Listing 2 in the Appendix below.

Lenses 84, 86, 88 and 90 have optical powers that alternate +, −, +, −, respectively. Lens 84 is biconvex; lens 86 has both convex and concave areas in its first surface and has a concave second surface; lens 88 has a concave first surface and convex second surface; and both of the surfaces of lens 90 include both convex and concave areas. Specifically, the first surface of lens 90 has a central convexity surrounded by a concave area, while the second surface has a central concavity surrounded by a convex area.

The performance of optical assembly 80, in terms of flatness of the MTF and width of the PSF, is similar to that of assembly 32, as described above. Optical assembly 80 is likewise optimized for use with a matched DCF having a 13×13 kernel. Details of the optical performance of assembly 80 and of the appropriate DCF kernel are omitted here for the sake of brevity, but they are provided in the above-mentioned U.S. Provisional Patent Application 61/005,428.

Optical Features—Design #3

In another embodiment of the present invention (not shown in the figures), an optical assembly may be designed for still greater depth of field, typically at the expense of larger F-number. The optical parameters of an assembly of this sort are given in Listing 3 in the Appendix below. This assembly, like those described above, may be used in camera 20 in place of assembly 22, and is likewise designed for use with a 3 Megapixel image sensor with a pitch of 1.75 pm. It is designed for depth of field from 30 cm to infinity, with a higher F-number (2.8). It comprises four lenses with cylindrically-symmetrical, even aspheric surfaces, having similar shapes to those shown in FIG. 6, along with an infra-red filter. The total optical track length from the outer surface of the first lens to the focal plane is 4.46 mm, while the effective focal length of the assembly is 3.46 mm.

The performance of the optical assembly described in Listing 3, in terms of flatness of the MTF and width of the PSF, is similar to that of the other embodiments described above. The optical assembly of Listing 3 is likewise optimized for use with a matched DCF having a 13×13 kernel. The kernel coefficients for use in the range from 30 cm to infinity are listed in the Appendix below in Listing 4. This depth of field may be extended further to shorter distances (over the range 15-30 cm, for example) by using a different DCF kernel that is computed for the shorter distance range.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

The listings below define, in standard ZEMAX® format, the surfaces of the elements of the optical imaging assemblies of Designs #1 and #2 (shown in FIGS. 2 and 6, respectively)

and of Design #3. The surfaces are defined in order from left to right, wherein surface 0 (SURF 0) refers to the entrance aperture of the assembly and the final surface (SURF 11 for FIG. 2, SURF 12 for FIG. 6) is the focal plane. Thus, in FIG. 2, for example, surfaces 1 and 2 are the left and right surfaces, respectively, of lens 36; surfaces 3 and 4 are the left and right surfaces of lens 38; and so forth. In FIG. 6, the aperture stop is listed as surface 1, and therefore the surfaces of lens 84 are surfaces 2 and 3, etc. In Design #3, surfaces 1 and 2 both belong to the aperture stop, and the first lens surface is therefore listed as surface 3.

The parameters in the listings are defined as follows:
TYPE is the surface type, which is either STANDARD (flat) or EVENASPH (aspheric), as defined by equation (1) above.
CURV is the curvature (1/radius) parameter c in equation (1), in units of $mm^{-1}$.
CON1 is the conic constant k in equation (1).
DISZ is the distance between each given surface and the next surface along the optical axis.
DIAM is the semi-diameter of the surface.
GLAS is the surface material, i.e. the material bounded by the given surface and the following surface. When GLAS is omitted for a given surface, it means that the gap between the given surface and the next one is filled with air. The material types are detailed below.
PARM1-PARM8 are the aspheric coefficients, $\alpha_1 \ldots \alpha_8$, as defined in equation (1).

The materials used in the designs below are commercially available from a number of manufacturers. They are defined in terms of Nd—the refractive index at wavelength 587.6 nm—and the Abbe number Vd, defined as (Nd−1)/(Nf−Nc), wherein Nf and Nc are the material refractive indices at wavelengths 486.1 nm and 656.3 nm respectively. The characteristics of the listed materials are as follows:

| APL: | Nd = 1.543388, | Vd = 56.5436 |
| OKP4HT: | Nd = 1.632355, | Vd = 23.3153 |
| E48R: | Nd = 1.529975, | Vd = 55.7738 |
| BSC7: | Nd = 1.516798, | Vd = 64.1983 |
| BK7: | Nd = 1.5168, | Vd = 64.1673 |

Listing 1—Optical Design of Assembly 32 (FIG. 2)
SURF 0
TYPE STANDARD
CURV 0.000000000000000000E+000 0
DISZ INFINITY
DIAM 0.000000000000E+000
SURF 1
STOP
TYPE EVENASPH
CURV 8.652237633723350900E−001
PARM 1 0.000000000000E+000
PARM 2 3.556227063415E−002
PARM 3 −1.089062784185E−001
PARM 4 4.629691666260E−001
PARM 5 −4.387807945192E−001
PARM 6 −4.779501535335E−001
PARM 7 1.567226446629E+000
PARM 8 −1.590081502924E+000
DISZ 4.918591963338E−001
GLAS APL
CONI −1.857909932973E−001
DIAM 6.950000000000E−001
SURF 2
TYPE EVENASPH
CURV 7.240350064998027400E−002
PARM 1 0.000000000000E+000
PARM 2 1.048380941008E−001
PARM 3 −4.093275315223E−001
PARM 4 1.057158198820E+000
PARM 5 −1.703691904200E+000
PARM 6 2.194255429500E−001
PARM 7 8.602986642535E+000
PARM 8 −1.713650438904E+001
DISZ 1.467780000000E−001
CONI 2.921633348792E+002
DIAM 6.630109323234E−001
SURF 3
TYPE EVENASPH
CURV 6.582393532429835200E−002
PARM 1 0.000000000000E+000
PARM 2 1.874359130576E−001
PARM 3 −8.428500795498E−001
PARM 4 1.608429030294E+000
PARM 5 −1.845894708062E+000
PARM 6 8.492227267211E−001
PARM 7 −3.461265414728E+000
PARM 8 5.395037033743E+000
DISZ 3.399561505650E−001
GLAS OKP4HT
CONI 5.772423778622E+002
DIAM 5.800000000000E−001
SURF 4
TYPE EVENASPH
CURV 4.572008684248432500E−001
PARM 1 0.000000000000E+000
PARM 2 1.727806009550E−001
PARM 3 −2.455392699842E−001
PARM 4 2.147678299600E−001
PARM 5 1.292588167463E−001
PARM 6 2.954230094084E−001
PARM 7 −1.138414958333E+000
PARM 8 1.174448011721E+000
DISZ 4.090480000000E−001
CONI 5.632319599800E+000
DIAM 6.475323348241E−001
SURF 5
TYPE EVENASPH
CURV −5.055988067419295900E−001
PARM 1 0.000000000000E+000
PARM 2 −1.918820887973E−002
PARM 3 4.560988330471E−002
PARM 4 −1.136056849588E−001
PARM 5 −5.838905522222E−001
PARM 6 5.544001660096E−003
PARM 7 5.391051259623E−001
PARM 8 1.348081905658E+000
DISZ 5.331518488075E−001
GLAS APL
CONI 9.450926019266E−001
DIAM 7.800000000000E−001
SURF 6
TYPE EVENASPH
CURV −8.813694775891357500E−001
PARM 1 0.000000000000E+000
PARM 2 4.314075611381E−002
PARM 3 −4.718758729341E−002
PARM 4 −3.066654302404E−002
PARM 5 −2.321062945477E−002
PARM 6 2.419075405288E−002
PARM 7 3.063452172233E−002
PARM 8 −1.959641527227E−002

DISZ 4.725638516542E−001
CONI −1.244690417685E+000
DIAM 9.498497894854E−001
SURF 7
TYPE EVENASPH
CURV 1.150755066312094100E−001
PARM 1 0.000000000000E+000
PARM 2 −1.923592779371E−001
PARM 3 7.412772698908E−002
PARM 4 −7.732360951631E−003
PARM 5 1.467403423796E−003
PARM 6 −6.710353346129E−004
PARM 7 −2.470331291476E−005
PARM 8 2.592956821290E−005
DISZ 3.523015889123E−001
GLAS E48R
CONI −1.535218663675E+003
DIAM 1.374102109558E+000
SURF 8
TYPE EVENASPH
CURV 6.952926153839873400E−001
PARM 1 0.000000000000E+000
PARM 2 −1.403912100593E−001
PARM 3 3.414464890976E−002
PARM 4 −5.893885696730E−003
PARM 5 −5.172712779502E−004
PARM 6 4.141036867406E−004
PARM 7 −6.726023078586E−005
PARM 8 4.794936110300E−006
DISZ 1.653690000000E−001
CONI −1.089911106292E+001
DIAM 1.820000000000E+000
SURF 9
TYPE STANDARD
CURV 0.000000000000000000E+000
DISZ 3.000000000000E−001
GLAS BSC7
DIAM 3.000000000000E+000
SURF 10
TYPE STANDARD
CURV 0.000000000000000000E+000
DISZ 5.860000000000E−001
DIAM 3.000000000000E+000
SURF 11
TYPE STANDARD
CURV 0.000000000000000000E+000
DISZ 0.000000000000E+000
DIAM 2.400000000000E+000
Listing 2—Optical Design of Assembly 80 (FIG. 6)
  SURF 0
  TYPE STANDARD
  CURV 0.000000000000000000E+000
  DISZ INFINITY
  DIAM 0.000000000000E+000
  SURF 1
  STOP
  TYPE STANDARD
  CURV 0.000000000000000000E+000
  DISZ 0.000000000000E+000
  DIAM 8.476473470170E−001
  SURF 2
  TYPE EVENASPH
  CURV 5.056698074154072400E−001
  PARM 1 0.000000000000E+000
  PARM 2 −3.807898669017E−002
  PARM 3 1.616038806445E−001
  PARM 4 −3.402056817233E−001

PARM 5 3.075818526139E−001
PARM 6 −1.021542614321E−001
PARM 7 0.000000000000E+000
PARM 8 0.000000000000E+000
DISZ 9.888573670790E−001
GLAS E48R
CONI −8.046706815290E−001
DIAM 9.356555021406E−001
SURF 3
TYPE EVENASPH
CURV −1.219006428108000000E−001
PARM 1 0.000000000000E+000
PARM 2 −1.110504044780E−001
PARM 3 5.151745259060E−002
PARM 4 3.945009358950E−003
PARM 5 −1.695414231200E−002
PARM 6 7.646395682330E−004
PARM 7 0.000000000000E+000
PARM 8 0.000000000000E+000
DISZ 1.000000000000E−001
CONI −1.582951965200E+002
DIAM 8.700000000000E−001
SURF 4
TYPE EVENASPH
CURV 8.944131810318747800E−002
PARM 1 0.000000000000E+000
PARM 2 −8.264633026010E−002
PARM 3 −2.409164895038E−002
PARM 4 1.030759924580E−001
PARM 5 −4.594118018960E−002
PARM 6 0.000000000000E+000
PARM 7 0.000000000000E+000
PARM 8 0.000000000000E+000
DISZ 4.516192419900E−001
GLAS OKP4HT
DIAM 9.731807648255E−001
SURF 5
TYPE EVENASPH
CURV 3.501273851640658300E−001
PARM 1 0.000000000000E+000
PARM 2 1.164396010373E−002
PARM 3 −1.432267810053E−001
PARM 4 1.360204719324E−001
PARM 5 −6.211487012366E−002
PARM 6 0.000000000000E+000
PARM 7 0.000000000000E+000
PARM 8 0.000000000000E+000
DISZ 5.360395786046E−001
CON1 4.984386111427E+000
DIAM 9.578585399754E−001
SURF 6
TYPE EVENASPH
CURV −6.588113299681951400E−001
PARM 1 0.000000000000E+000
PARM 2 7.658448722731E−002
PARM 3 −1.705368067862E−001
PARM 4 9.987433262699E−002
PARM 5 −3.876588098669E−003
PARM 6 −2.565260607301E−002
PARM 7 0.000000000000E+000
PARM 8 0.000000000000E+000
DISZ 4.935253122970E−001
GLAS E48R
CONI −9.467960636861E+000
DIAM 9.831444938115E−001
SURF 7
TYPE EVENASPH

CURV −9.087913492681630700E−001
PARM 1 0.000000000000E+000
PARM 2 9.698399374039E−002
PARM 3 −5.214845631696E−003
PARM 4 −1.388830269973E−001
PARM 5 1.432816283278E−001
PARM 6 −4.710438529084E−002
PARM 7 4.139222327001E−003
PARM 8 0.000000000000E+000
DISZ 1.000000000000E−001
CONI −1.340598402704E+000
DIAM 1.068651955103E+000
SURF 8
TYPE EVENASPH
CURV 4.689569704360405700E−001
PARM 1 0.000000000000E+000
PARM 2 −5.626183524491E−002
PARM 3 −5.585528216147E−002
PARM 4 4.198072092161E−002
PARM 5 1.536766416901E−002
PARM 6 −3.532765015935E−002
PARM 7 1.814215494415E−002
PARM 8 −3.275934781064E−003
DISZ 7.554784637700E−001
GLAS E48R
CONI −2.718478553094E+001
DIAM 1.137865088752E+000
SURF 9
TYPE EVENASPH
CURV 8.823769852184594200E−001
PARM 1 0.000000000000E+000
PARM 2 −7.919848381034E−002
PARM 3 1.809498773676E−002
PARM 4 −1.339137020527E−003
PARM 5 −1.781442363099E−003
PARM 6 5.048840083067E−004
PARM 7 −3.682720298506E−006
PARM 8 −1.042710691821E−005
DISZ 7.000000000000E−001
CON1 −6.800726468876E+000
DIAM 1.287839159851E+000
SURF 10
TYPE STANDARD
CURV 0.000000000000000000E+000
DISZ 3.000000000000E−001
GLAS BK7
DIAM 1.394144986815E+000
SURF 11
TYPE STANDARD
CURV 0.000000000000000000E+000
DISZ 4.2181205728608E−001
DIAM 1.437069728832E+000
SURF 12
TYPE STANDARD
CURV 0.000000000000000000E+000
DISZ 0.000000000000E+000
DIAM 1.579200739933E+000
Listing 3—Optical Design of Design #3
SURF 0
TYPE STANDARD
CURV 0.000000000000000000E+000
DISZ INFINITY
DIAM 0.000000000000E+000
SURF 1
TYPE STANDARD
CURV 0.000000000000000000E+000
DISZ 4.120000000000E−002
DIAM 7.013816278164E−001
SURF 2
STOP
TYPE STANDARD
CURV 0.000000000000000000E+000
DISZ −4.120000000000E−002
DIAM 6.348389881528E−+001
SURF 3
TYPE EVENASPH
CURV 5.909097373095446600E−001
PARM 1 0.000000000000E+000
PARM 2 −2.421069661560E−002
PARM 3 −6.629652833532E−002
PARM 4 −1.820683613102E+000
PARM 5 6.311198899189E+000
PARM 6 −5.443148130016E+000
PARM 7 −2.133682443725E+001
PARM 8 3.444153394371E+001
DISZ 5.521398905428E−001
GLAS E48R
CON1 −2.425434234429E+000
DIAM 6.766646281143E−001
SURF 4
TYPE EVENASPH
CURV −2.838072331649754700E−001
PARM 1 0.000000000000E+000
PARM 2 −2.000348865126E−001
PARM 3 −5.267493298532E−001
PARM 4 1.756640967187E+000
PARM 5 −4.041257486494E+000
PARM 6 4.036344855260E+000
PARM 7 4.770313003834E+000
PARM 8 −1.176555921343E+001
DISZ 6.385822779398E−002
CON1 1.456361342343E+001
DIAM 7.113133976160E−001
SURF 5
TYPE EVENASPH
CURV 1.584723852269129800E−001
PARM 1 0.000000000000E+000
PARM 2 −1.331866566657E−001
PARM 3 −1.070736410865E−002
PARM 4 −1.495353436826E+000
PARM 5 4.836495708357E+000
PARM 6 −1.351516650496E+000
PARM 7 −5.000738045425E+000
PARM 8 0.000000000000E+000
DISZ 3.089403428113E−001
GLAS OKP4
DIAM 6.180000000000E−001
SURF 6
TYPE EVENASPH
CURV 5.695931147505922700E−001
PARM 1 0.000000000000E+000
PARM 2 3.896773377328E−002
PARM 3 −1.515394887122E−001
PARM 4 1.317011238609E−001
PARM 5 −2.508562175005E+000
PARM 6 8.282839659549E+000
PARM 7 −8.499961477375E+000
PARM 8 0.000000000000E+000
DISZ 5.860322065927E−001
CONI 3.427301023612E+000
DIAM 7.309526892528E−001
SURF 7
TYPE EVENASPH
CURV −9.086998755395645500E−001

PARM 1 0.000000000000E+000
PARM 2 9.535502337999E−002
PARM 3 −2.544111819002E−001
PARM 4 2.211525645351E+000
PARM 5 −5.833781719591E+000
PARM 6 7.831655225952E+000
PARM 7 −4.254875699733E+000
PARM 8 0.000000000000E+000
DISZ 7.162537375766E−001
GLAS E48R
CONI 1.607467310363E−001
DIAM 8.473702496420E−001
SURF 8
TYPE EVENASPH
CURV −1.270174081492411800E+000
PARM 1 0.000000000000E+000
PARM 2 −2.778177539103E−002
PARM 3 −1.304215284549E−001
PARM 4 2.342033972870E−001
PARM 5 −3.821300933607E−002
PARM 6 −2.278791134591E−001
PARM 7 2.479996401730E−001
PARM 8 −8.774467061647E−002
DISZ 6.330357762109E−002
CONI −1.708199050956E+000
DIAM 1.144610793659E+000
SURF 9
TYPE EVENASPH
CURV 1.771577399681375500E−001
PARM 1 0.000000000000E+000
PARM 2 −1.042538547482E−001
PARM 3 6.820633871373E−002
PARM 4 −7.108060005806E−002
PARM 5 7.780526336552E−002
PARM 6 −5.262966817479E−002
PARM 7 1.767683492120E−002
PARM 8 −2.336322205020E−003
DISZ 7.037045931448E−001
GLAS E48R
CONI 1.097128072065E+001
DIAM 1.599886303846E+000

SURF 10
TYPE EVENASPH
CURV 7.802500944760985000E−001
PARM 1 0.000000000000E+000
PARM 2 −8.678790894368E−002
PARM 3 3.197832749502E−002
PARM 4 −1.581357761894E−002
PARM 5 1.020827688787E−002
PARM 6 −4.619592697300E−003
PARM 7 1.032469177577E−003
PARM 8 −8.940225235564E−005
DISZ 8.670000000000E−001
CON1 −8.296298041155E+000
DIAM 1.971015673492E+000
SURF 11
TYPE STANDARD
CURV 0.000000000000000000E+000
DISZ 3.000000000000E−001
GLAS BK7
DIAM 2.400000000000E+000
SURF 12
TYPE STANDARD
CURV 0.000000000000000000E+000
DISZ 3.000000000000E−001
DIAM 2.400000000000E+000
SURF 13
TYPE STANDARD
CURV 0.000000000000000000E+000 0
DISZ 0.000000000000E+000
DIAM 2.400000000000E+000

Listing 4—Kernel Coefficients of Design #3

In contrast to the coefficient listing in Table I above, the kernel coefficients for Design #3 are listed separately below for the red, green and blue sub-image channels of the mosaic input image that is generated by the image sensor. Like the coefficients in Table I, however, the kernel coefficients below are meant to be applied by a DCF of the type described in the above-mentioned PCT publication WO 07/054931. The values in the tables below are 100 times the actual coefficient values.

The red sub-channel:

| −0.18 | 0 | −0.09 | 0 | −0.48 | 0 | 0.74 | 0 | −0.48 | 0 | −0.09 | 0 | −0.18 |
|---|---|---|---|---|---|---|---|---|---|---|---|---|
| 0 | 0 | 0 | 0 | 0 | 0 | 0 | 0 | 0 | 0 | 0 | 0 | 0 |
| −0.09 | 0 | −0.15 | 0 | 0.68 | 0 | −2.42 | 0 | 0.68 | 0 | −0.15 | 0 | −0.09 |
| 0 | 0 | 0 | 0 | 0 | 0 | 0 | 0 | 0 | 0 | 0 | 0 | 0 |
| −0.48 | 0 | 0.68 | 0 | −5.2 | 0 | −2.71 | 0 | −5.2 | 0 | 0.68 | 0 | −0.48 |
| 0 | 0 | 0 | 0 | 0 | 0 | 0 | 0 | 0 | 0 | 0 | 0 | 0 |
| 0.74 | 0 | −2.42 | 0 | −2.71 | 0 | 138.85 | 0 | −2.71 | 0 | −2.42 | 0 | 0.74 |
| 0 | 0 | 0 | 0 | 0 | 0 | 0 | 0 | 0 | 0 | 0 | 0 | 0 |
| −0.48 | 0 | 0.68 | 0 | −5.2 | 0 | −2.71 | 0 | −5.2 | 0 | 0.68 | 0 | −0.48 |
| 0 | 0 | 0 | 0 | 0 | 0 | 0 | 0 | 0 | 0 | 0 | 0 | 0 |
| −0.09 | 0 | −0.15 | 0 | 0.68 | 0 | −2.42 | 0 | 0.68 | 0 | −0.15 | 0 | −0.09 |
| 0 | 0 | 0 | 0 | 0 | 0 | 0 | 0 | 0 | 0 | 0 | 0 | 0 |
| −0.18 | 0 | −0.09 | 0 | −0.48 | 0 | 0.74 | 0 | −0.48 | 0 | −0.09 | 0 | −0.18 |

The green sub-channel:

| −0.68 | 0 | −0.12 | 0 | −0.03 | 0 | −0.04 | 0 | −0.03 | 0 | −0.12 | 0 | −0.68 |
|---|---|---|---|---|---|---|---|---|---|---|---|---|
| 0 | 1.31 | 0 | −0.07 | 0 | −0.33 | 0 | −0.33 | 0 | −0.07 | 0 | 1.31 | 0 |
| −0.12 | 0 | −2.24 | 0 | 0.15 | 0 | 0.85 | 0 | 0.15 | 0 | −2.24 | 0 | −0.12 |
| 0 | −0.07 | 0 | 4.18 | 0 | 0.74 | 0 | 0.74 | 0 | 4.18 | 0 | −0.07 | 0 |
| −0.03 | 0 | 0.15 | 0 | −9.56 | 0 | −12.61 | 0 | −9.56 | 0 | 0.15 | 0 | −0.03 |
| 0 | −0.33 | 0 | 0.74 | 0 | 8.01 | 0 | 8.01 | 0 | 0.74 | 0 | −0.33 | 0 |
| −0.04 | 0 | 0.85 | 0 | −12.61 | 0 | 140.4 | 0 | −12.61 | 0 | 0.85 | 0 | −0.04 |
| 0 | −0.33 | 0 | 0.74 | 0 | 8.01 | 0 | 8.01 | 0 | 0.74 | 0 | −0.33 | 0 |
| −0.03 | 0 | 0.15 | 0 | −9.56 | 0 | −12.61 | 0 | −9.56 | 0 | 0.15 | 0 | −0.03 |
| 0 | −0.07 | 0 | 4.18 | 0 | 0.74 | 0 | 0.74 | 0 | 4.18 | 0 | −0.07 | 0 |

-continued

| | | | | | | | | | | | | |
|---|---|---|---|---|---|---|---|---|---|---|---|---|
| −0.12 | 0 | −2.24 | 0 | 0.15 | 0 | 0.85 | 0 | 0.15 | 0 | −2.24 | 0 | −0.12 |
| 0 | 1.31 | 0 | −0.07 | 0 | −0.33 | 0 | −0.33 | 0 | −0.07 | 0 | 1.31 | 0 |
| −0.68 | 0 | −0.12 | 0 | −0.03 | 0 | −0.04 | 0 | −0.03 | 0 | −0.12 | 0 | −0.68 |

The blue sub-channel:

| | | | | | | | | | | | | |
|---|---|---|---|---|---|---|---|---|---|---|---|---|
| −0.19 | 0 | 0.11 | 0 | −0.71 | 0 | −0.74 | 0 | −0.71 | 0 | 0.11 | 0 | −0.19 |
| 0 | 0 | 0 | 0 | 0 | 0 | 0 | 0 | 0 | 0 | 0 | 0 | 0 |
| 0.11 | 0 | −0.57 | 0 | 1.93 | 0 | 3.22 | 0 | 1.93 | 0 | −0.57 | 0 | 0.11 |
| 0 | 0 | 0 | 0 | 0 | 0 | 0 | 0 | 0 | 0 | 0 | 0 | 0 |
| −0.71 | 0 | 1.93 | 0 | −4.4 | 0 | −21.77 | 0 | −4.4 | 0 | 1.93 | 0 | −0.71 |
| 0 | 0 | 0 | 0 | 0 | 0 | 0 | 0 | 0 | 0 | 0 | 0 | 0 |
| −0.74 | 0 | 3.22 | 0 | −21.77 | 0 | 187.13 | 0 | −21.77 | 0 | 3.22 | 0 | −0.74 |
| 0 | 0 | 0 | 0 | 0 | 0 | 0 | 0 | 0 | 0 | 0 | 0 | 0 |
| −0.71 | 0 | 1.93 | 0 | −4.4 | 0 | −21.77 | 0 | −4.4 | 0 | 1.93 | 0 | −0.71 |
| 0 | 0 | 0 | 0 | 0 | 0 | 0 | 0 | 0 | 0 | 0 | 0 | 0 |
| 0.11 | 0 | −0.57 | 0 | 1.93 | 0 | 3.22 | 0 | 1.93 | 0 | −0.57 | 0 | 0.11 |
| 0 | 0 | 0 | 0 | 0 | 0 | 0 | 0 | 0 | 0 | 0 | 0 | 0 |
| −0.19 | 0 | 0.11 | 0 | −0.71 | 0 | −0.74 | 0 | −0.71 | 0 | 0.11 | 0 | −0.19 |

What is claimed is:

1. An optical assembly comprising four even aspheric lenses arranged along an optical axis and configured to form an image of an object onto a focal plane, such that a total track length from a front surface of the optical assembly to the focal plane is no greater than about 5 millimeters (mm), the lenses having alternating positive and negative respective refractive powers; wherein:
the four even aspheric lenses include a first lens adjacent to a second lens, both the first lens and the second lens being meniscus lenses,
the four even aspheric lenses include a third lens and a fourth lens, wherein the first lens, second lens, third lens and fourth lens are arranged in numerical order of decreasing distance from the focal plane along the optical axis, such that the first lens is furthest from the focal plane and the fourth lens nearest to the focal plane, and the fourth lens has a first surface and a second surface each comprising respective convex and concave areas.

2. The optical assembly of claim 1, wherein the first surface has a central convexity near the optical axis surrounded by a concave area, and the second surface has a central concavity near the optical axis surrounded by a convex area.

3. The optical assembly of claim 1, further comprising:
an image sensor having an active surface that receives the image and outputs a set of image data representative of the image; and
a processing engine that applies one or more deconvolution filters to the set of image data that are configured to correct for blur in the image formed by the lenses.

4. The optical assembly of claim 3, wherein the lenses are configured to form the image having a modulation transfer function (MTF) that varies over a predefined depth of field by no more than about 1.5.

5. The optical assembly of claim 4, wherein the predefined depth of field has a near-field distance of about 50 centimeters from the front surface of the optical assembly.

6. The optical assembly of claim 4, wherein the predefined depth of field has a near-field distance of about 30 centimeters from the front surface of the optical assembly.

7. The optical assembly of claim 4, wherein the image formed by the lenses has a near-field distance of about 30 centimeters from the front surface of the optical assembly, and further wherein the one or more deconvolution filters are selected to extend the near-field distance associated with the lenses to about 15 centimeters from the front surface of the optical assembly.

8. The optical assembly of claim 3, the one or more deconvolution filters comprising a deconvolution filter kernel having a filter kernel width, and the lenses having a point spread function having an extent, wherein the filter kernel width is selected to be within a percentage range of the extent of the point spread function.

9. The optical assembly of claim 8, wherein the percentage range extends from about 0 percent to about 20 percent.

10. The optical assembly of claim 8, wherein the extent of the point spread function corresponds with the blur in the image formed by the lenses.

11. The optical assembly of claim 3, wherein the image sensor has at least about three million pixels, which includes at least two pixels having a center-to-center distance of about 1.75 micrometers.

12. The optical assembly of claim 1, wherein the first lens and the fourth lens are formed of a common optical material.

13. The optical assembly of claim 12, wherein the common optical material has an index of refraction between about 1.52 and about 1.57, and an abbe number between about 54.5 and about 58.5.

14. The optical assembly of claim 1, wherein the first lens, the third lens and the fourth lens are formed of a common optical material.

15. The optical assembly of claim 14, wherein the common optical material has an index of refraction between about 1.51 and about 1.56 and an abbe number between about 52.5 and about 57.5.

16. The optical assembly of claim 14, wherein the lenses are arranged to focus the light with an F-number no greater than about 2.8, the total track length is no greater than about 4.5 mm, and an effective focal length of the lenses is between about 3.4 mm and about 3.5 mm.

17. A camera module for an optical device, comprising:
an image sensor comprising an array of optically sensitive pixels;
an optical assembly comprising four lenses substantially centered about a common optical axis and configured to form an image of an object at a focal plane, wherein the image comprises a blur component characterized by a point spread function in which at least about 20 percent of point source energy captured by the optical assembly is projected to an area of the image sensor greater than about five by five pixels in dimension and less than about thirteen by thirteen pixels in dimension; and a processing engine comprising a deconvolution filter having a kernel width that is substantially the same dimension as an extent of the point spread function; wherein:

the four lenses have alternating positive and negative refractive powers, respectively, a first lens and a second lens of the four lenses are meniscus lenses, the first lens and second lens being furthest and second furthest, respectively, from the image sensor along the common optical axis, and the optical assembly has a total track length of no more than about 5 millimeters (mm).

18. The camera module of claim 17, wherein:

the optical assembly has an F-number no greater than about 2.4;

the optical assembly has a depth of field of about 50 centimeters from a front surface of the optical assembly to infinity;

the total track length is no more than about 4.0 mm;

the optical assembly has an effective focal length that is about 3.4 mm; and two of the four lenses are formed of a first optical material, a third of the four lenses is formed of a second optical material, and a fourth of the four lenses is formed of a third optical material.

19. The camera module of claim 18, wherein the deconvolution filter is selected to extend the depth of field of the optical assembly to be about 30 centimeters from the front surface of the optical assembly to infinity.

20. The camera module of claim 17, wherein:

the optical assembly has an F-number no greater than about 2.2;

the optical assembly has a depth of field of about 70 centimeters from a front surface of the optical assembly to infinity;

the total track length is no more than about 4.9 mm; and the optical assembly has an effective focal length between about 3.7 and 3.75 mm.

21. The camera module of claim 17, wherein:

the optical assembly has an F-number no greater than about 2.8;

the optical assembly has a depth of field of about 30 centimeters from a front surface of the optical assembly to infinity;

the total track length is no more than about 4.5 mm;

the optical assembly has an effective focal length between about 3.4 and about 3.6 mm; and three of the four lenses are formed of a first optical material, and a fourth of the four lenses is formed of a second optical material.

22. The camera module of claim 21, wherein the deconvolution filter is selected to extend the depth of field of the optical assembly to be about 15 centimeters from the front surface of the optical assembly to infinity.

23. An optical assembly comprising four even aspheric lenses arranged along an optical axis and configured to form an image of an object onto a focal plane, such that a total track length from a front surface of the optical assembly to the focal plane is no greater than about 5 millimeters (mm), the lenses having alternating positive and negative respective refractive powers, wherein the four even aspheric lenses comprises a first lens, a second lens, a third lens and a fourth lens, the first lens and the fourth lens are made of the same material, the first lens is furthest from the focal plane along the optical axis, and the fourth lens is closest to the focal plane along the optical axis, and the fourth lens has a first surface and a second surface each comprising respective convex and concave areas.

* * * * *